Patented Dec. 10, 1929

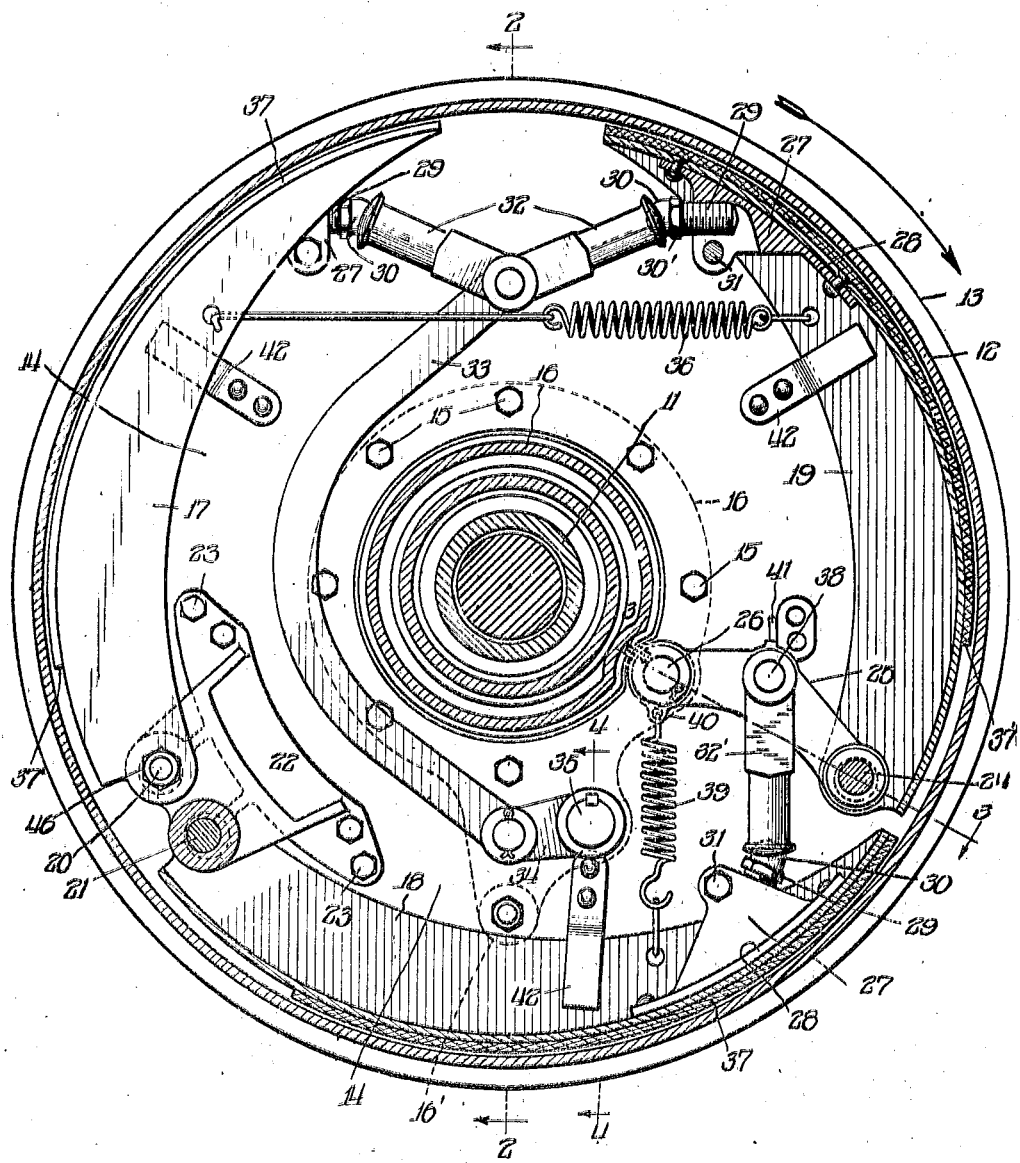

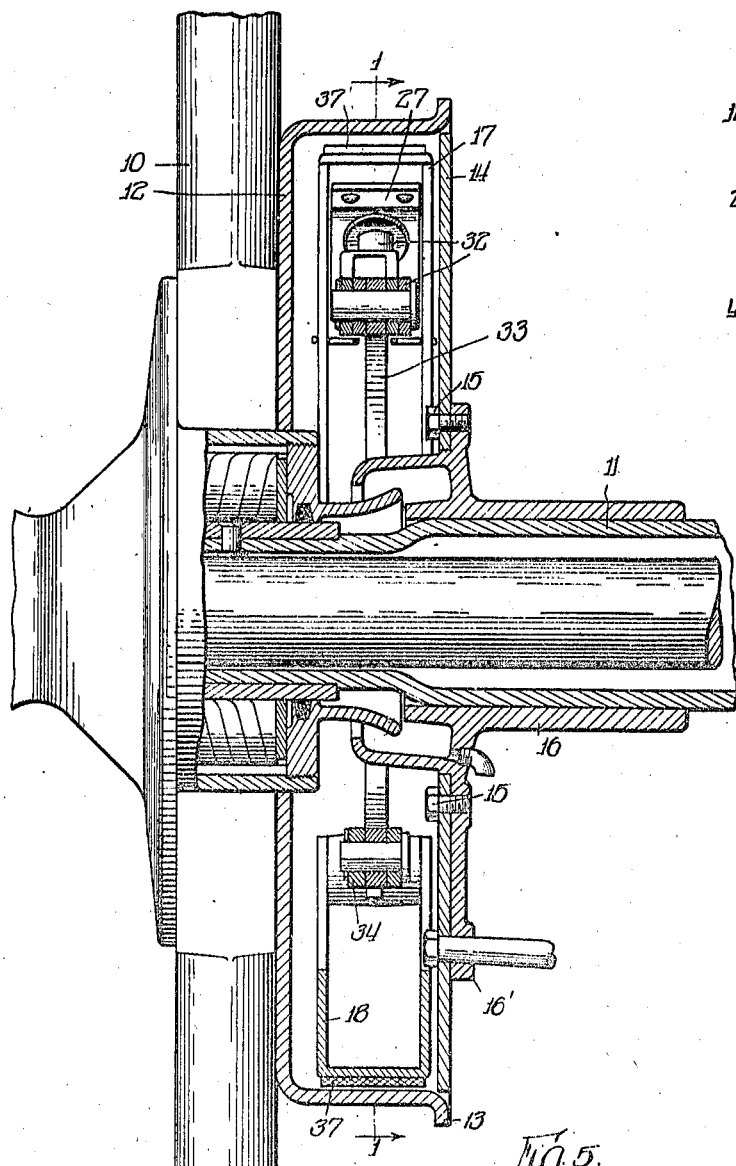
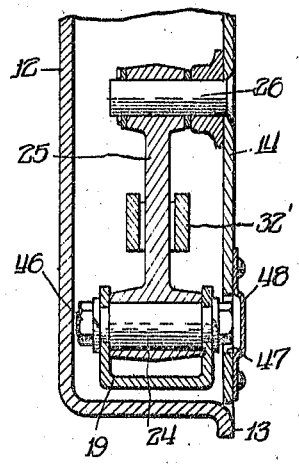
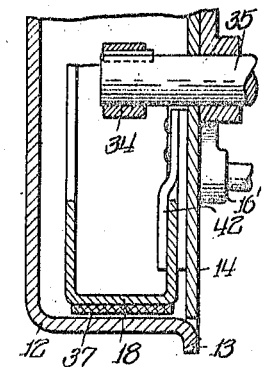
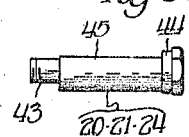

1,738,750

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

BRAKING APPARATUS

Application filed October 20, 1924. Serial No. 744,533.

My invention relates to braking apparatus, and more especially, though not necessarily, to brakes for automobiles. My invention is particularly concerned with the type of brakes now known as "servo", wherein the momentum of the automobile furnishes a brake applying force. In my braking apparatus this "servo" action does not constitute the whole brake applying force, but is supplementary to the manual or primary applying force, thereby giving me a self-assisting brake.

One object of my invention is to utilize the gripping of the brakes further to apply them in such a manner that the power of the gripping brake members may be multiplied in further applying the other members. I also contemplate the provision of a self-assisted braking apparatus in which sufficient braking effect may be obtained when the vehicle is moving in a reverse direction. I contemplate further a braking apparatus of the self-assisting type in which there is provision for sufficient braking action even though the friction member which provides the traction for effecting the self-assisting action has become too worn or otherwise disabled to function properly.

A further object is to so apply the actuating and self-assisting forces to a plurality of brake shoes that the shoes are thrust radially outwardly with full force rather than tangentially with a minor radial component. I secure this latter result in part by providing more shoes in the brake than the usual two, thereby approaching closer to the ideal braking action wherein the brake lining is thrust radially at all points, and in part by an improved form of linkage between the shoes for applying a direct radial force to the shoes.

Still another object is to utilize an effective braking friction over a larger portion of the whole 360° of the drum. In the design of my three shoe brake I am able to secure 285° of braking surface as compared with 244° which has been found the maximum practicable with two shoe internal brakes. It is to be borne in mind also that with three shoes, the arc of each is shorter and hence the radial component of thrust on the shoe averages higher than in a shoe of a larger arc where the ends are thrust more tangentially with only minor radial components. As a further advantage of my braking apparatus, I prevent distortion of the drums, and the consequent loss of braking surface, by arranging my three internal shoes in equally spaced relation about the drum and applying them with more or less equal force.

These and further objects and advantages of my invention will appear from the following description of a particular embodiment thereof, as illustrated in the accompanying drawings, wherein—

Figure 1 is a vertical section of my brake mechanism applied to the right rear wheel of an automobile and looking in toward the differential housing. Figure 1 may be considered also as being taken on the line 1—1 of Figure 2;

Figure 2 is a transverse vertical section taken on the line 2—2 of Figure 1 looking rearwardly;

Figure 3 is a fragmentary detail of the floating pivot lever taken on the line 3—3 of Figure 1;

Figure 4 is a fragmentary section of the drum and one of the shoes taken on the line 4—4 of Figure 1; and Figure 5 is a detail elevation of one of the eccentric pins.

The drawings show my invention applied to the right rear wheel of an automobile although I contemplate that my braking apparatus is readily adapted for mounting on the front wheels, if incorporated in a four wheel brake system.

The wheel 10 as shown in the drawings is mounted by a roller bearing on the usual rear axle housing 11. The brake drum 12 is secured to the inner face of the wheel 10, the cylindrical portion thereof projecting inwardly from the disc portion and carrying an outwardly bent strengthening flange 13 at its inner edge.

A dust pan or drum closure plate 14, in the form of a flat disc of a diameter only slightly less than the inside diameter of the drum, is disposed across the open side of the drum and substantially in alignment with the strengthening flange 13. The plate 14 is rigidly secured by bolts 15, or otherwise, to the flanged sleeve 16 fixed on the axle housing 11. I use the plate 14 as a support upon which to mount or anchor the non-rotary parts of the brake, which parts are disposed within the enclosure formed by the drum and the plate 14.

I employ three internal brake shoes 17, 18 and 19, functioning as auxiliary, secondary and primary brake shoes respectively. The shoes 17 and 18 are pivoted by anchor pins 20 and 21 to a fixed bracket 22, which is secured by bolts 23 to the plate 14. The third brake shoe 19 is mounted upon a floating pivot pin 24 at the free end of a lever 25, which in turn is mounted upon an anchor pin 26 secured directly to the plate 14.

The lateral brake shoes 17 and 19 are arranged oppositely so that their free upper ends lie adjacent one another at the top of the brake drum. All three brake shoe assemblies, however, are identical and hence interchangeable. Each shoe, which is of channel cross section, carries adjacent its free end an end member 27 which has a flat base 28 arcuately conformed to mate the web of the channel-shaped brake shoe, and riveted thereto. A stud 29 is threaded into each end member 27. The outer end of each stud has a rounded head 30 and a hexagonal portion 30' for engagement by a wrench to adjust the stud. Each end member 27 at one side of its stud 29 is slotted and provided with a clamping cap screw 31, whereby the stud when once adjusted can be locked.

For applying the lateral brake shoes 17 and 19, I provide a pair of compression links 32 having sockets in their outer ends to mate the heads 30 of the studs. These compression links are arranged as toggle links, their inner ends being pivoted to the upper end of a C-shaped link 33. The C link 33 extends downwardly around the oil draining boss of the housing sleeve 16 to a point directly beneath its connection to the toggle links, where it is pivoted to an arm 34 on the brake shaft 35. The brake shaft is journalled in the plate 14 and in a bracket arm 16' which extends downwardly from the housing sleeve 16 to embrace the end of a truss rod for the rear axle housing. The brake shaft 35 may be rocked in the usual manner by the usual shaft arm and brake rod (not shown).

A tension spring 36 connected between the free ends of the lateral brake shoes 17 and 19 urges them to their retracted position and serves to maintain the toggle links and studs in their ball and socket relation. When the brake shaft is rocked to apply the brakes (i. e., clockwise in Fig. 1), the arm 34 lifts the C link 33 and forces the toggle links 32 apart to swing the shoes into engagement with the drum 12.

Brake linings 37 are secured to the web portions of the brake shoes, the linings terminating a distance from the pivoted ends of the shoes, as indicated at 37'. A slight swing of the brake shoe will thus bring the entire length of the lining sufficiently out of contact with the drum, even though the pivotal point of the shoe is very close to the drum.

Although the action of the brake shaft will directly cause some force to be applied on the lower brake shoe 18, as will later be described, the chief source of power for applying the lower shoe is obtained from the gripping of the shoe 19, so that the harder the driver compresses the brake pedal, the harder the lower brake shoe will be applied. To obtain this action, I provide the lever 25 intermediate its anchor pin 26 and the floating pivot pin 24 of the shoe 19, with a link pin 38 upon which is mounted a bifurcated upper end of the compression link 32'. The link 32' and the toggle links 32, it may be added, are all identical and interchangeable. The rounded end of the stud 29 of the lower shoe 18 extends into the socket at the lower end of the compression link 32', and the link and stud are held in this ball and socket relation by a tension spring 39 connecting the free end of the shoe 18 with an eye 40 on the lever 25 adjacent the anchor pin 26.

The tension spring 39, in addition to holding the link and stud together and urging the lower brake shoe upwardly out of engagement with the drum, causes it to swing the lever 25 upwardly into engagement with a stop lug 41 which is riveted to the plate 14. This normally positions the floating pivot pin 24 of the floating shoe 19 and thereby serves to hold the pivoted end of the shoe out of engagement with the drum, while the spring 36 holds its free end out of engagement with the drum.

When the driver compresses the brake pedal and thereby rotates the brake shaft 35, the C-shaped link 33 is raised to spread the toggle links 32. This swings the brake shoe 17 about its fixed pivot 21 into engagement with the drum and also swings the shoe 19 about its floating pivot 24 into engagement with the drum. The toggle mechanism, of course, equalizes the force applied to the two shoes. The actuation of the brake shoe 17, it is to be noted, is not dependent upon the gripping of the shoes 19 or 18 or on the actuation of the latter. The brake shoe 17 is especially effective when the automobile is moving backwardly, because the reverse movement of the drum tends slightly to tighten the shoe as it grips the drum.

As the shoe 19 grips the drum, it will be carried with the drum to swing its floating pivot pin 24 downwardly about the anchor pin 26 and move the lever 25 out of engagement with the stop 41 against the tension of the spring 39. Downward swinging of the lever 25 will force the compression link 32' against the rounded end of the stud 29 and swing the lower shoe 18 about its anchor pin 21 and into engagement with the drum. As the driver increases the pressure on the foot pedal, the shoe 19 will be applied with greater force, and consequently the increased friction between it and the drum will force the former downwardly to apply the lower shoe 18 more tightly against the drum. As regards the actuation of the lower shoe 18, the brake is chiefly self-assisting. It is true, however, that should the brake lining of the shoe 19 be so worn that it no longer grips the drum effectively, a substantial part of the force of the toggle links would be imparted through the floating shoe 19 to the lever 25 and swing the latter downwardly independently of any gripping action. This would serve to apply a considerable force to the shoe 18.

The anchor pin 26 and the floating pivot pin 24 are disposed substantially on a radial line from the axis of the wheel, whereby the tangential force from the gripping action of the brake shoe 19 is applied with maximum leverage to the lever 25. The compression link 32' is pivoted substantially midway between the anchor pin 26 and the floating pin 24 to double the downward force imparted to the shoe 18. The link pin 38 is disposed horizontally opposite the anchor pin 26 to effect a maximum leverage in moving the vertical compression link 32' downwardly.

By mounting the anchor pin 26 on a radial line passing through the floating pivot pin from the axis of the rear axle, and by confining the floating pivot pin to movement but a short distance on either side of this radial line, I minimize the tendency of the lever 25 to swing the lower end of the floating shoe either further into engagement with the drum to lock the shoe and drum, or further out of engagement to release the shoe, when the brakes are applied.

When the automoble is moving in a reverse direction and the brakes are applied, the self-assisting action on the lower shoe 18 is not obtained, of course, but the action of the brake shoe 19 is not impaired by its connection with the shoe 18 since the stop lug 41 limits the floating pin 24 against further upward movement.

Since all of the brake shoes are mounted by pins passing through their lateral flanges, the shoes are kept with their webs and brake linings parallel with the cylindrical portion of the brake drum. I prefer to provide guide plates 42 of spring metal attached to the plate 14 and bearing against a lateral flange of each shoe to prevent rattling of the shoes.

I also provide a convenient means for adjusting the brake shoes both initially and to compensate for wear. The anchor pins 20 and 21, and also the floating pivot pin 24, are eccentric pins, as shown in Figures 3 and 5, the reduced threaded end 43 and short length 44 immediately beyond the hexagonal head being on one axis and the intermediate cylindrical portion 45 being on another axis eccentric to the first axis. When the pins are in use the portions 43 and 44 are disposed in the respective lateral flanges of the channel-shaped brake shoes, while the mid-portions 45 are held in the bracket 22 or lever 25, as the case may be. In initially assembling the brakes, these eccentric pins are turned until the end of the brake lining adjacent the pin is the correct distance from the drum. The nuts 46 are then tightened to clamp the eccentric pins in their adjusted positions. The studs 29 are then adjusted until the free ends of the respective shoes are the correct distance from the drum. The locking cap screws 31 in the end members 27 are then tightened. As the brake linings wear down, it is necessary only to adjust the studs 29 from time to time to compensate for wear, the eccentric pins needing resetting only when they have been taken out to permit the removal of the shoes for relining.

When the brake shoes are to be thus adjusted or when for other reasons it is desired to gain access to the several parts, the wheel is removed from the axle housing, the drum being carried with the wheel. This leaves all of the parts exposed and unobstructed by surrounding parts of the brake or automobile. Although the drum is removed at such time, a convenient index as to the position of the drum while the shoes are being adjusted is provided by the periphery of the plate 14, which is but a trifle less in diameter than the inner surface of the drum. Access may be had to the head of the floating pivot pin 24 through an opening 47 in the plate 14, which is preferably closed by a small cover plate 48.

An important feature of my braking apparatus, it is to be pointed out, is that the self-assisting feature of the brake does not affect the manual force by which it is initially applied—or, in other words, that there is no reaction, by the self-assisting action, upon the manually operated member. The driver can therefore gauge by the pressure he is applying on the foot pedal what braking force is being applied to the wheels; and while the foot pressure initially applied to the brakes is multipled by the self-assisting action, the pressure which the driver must exert to retain this degree of application does not increase. The three shoes are always controlled by the pressure exerted on the brake pedal; there is no tendency for the brakes to lock themselves; and a slight release of the foot pedal pressure will immediately relieve the three brake shoes correspondingly.

While I have disclosd my invention as embodied in this particular form, it is to be understood that many changes may be made without departing from the scope or spirit of my invention.

What I claim is:

1. A self-assisting braking apparatus comprising a rotary drum, a floating shoe mounted frictionally to engage the drum and partake of the rotary movement thereof, means for applying the floating shoe, a second shoe adapted frictionally to engage the drum, and means for translating the tractive force imparted to the floating shoe by the drum and imparting it as a thrust to the second shoe, along an axis perpendicular to a cord drum from the heel to the toe of the second shoe.

2. A self-assisting braking apparatus comprising a rotary drum, a floating shoe mounted frictionally to engage the drum and partake of the rotary movement thereof, means for applying the floating shoe, a second shoe adapted frictionally to engage the drum, means for multiplying the tractive force imparted to the floating shoe by the drum and translating it into a thrust upon the second shoe along an axis perpendicular to a cord drawn from the heel to the toe of the second shoe.

3. In an apparatus of the class described, the combination of a rotary drum, a pair of brake shoes mounted for frictionally engaging the drum, means for applying the first of said shoes, the first shoe being adapted to partake through a limited arc of the rotary movement of the drum, and a lever pivotally connecting the shoes and arranged to be actuated by the rotary movement imparted to the first shoe for imparting a thrust on the second shoe along an axis perpendicular to a cord drawn from the heel to the toe of the second shoe.

4. A self-assisting braking apparatus comprising a rotary drum, a floating shoe mounted frictionally to engage the drum internally and partake of the rotary movement thereof, means for applying the floating shoe, a second shoe adapted frictionally to engage the drum internally, and means for translating the tractive force imparted to the floating shoe by the drum and imparting it as a thrust to the second shoe which at the midpoint of the second shoe has a substantially radial thrust.

5. A self-assisting braking apparatus comprising a rotary drum, a floating shoe mounted frictionally to engage the drum internally and partake of the rotary movement thereof, means for applying the floating shoe, a second shoe adapted frictionally to engage the drum internally, means for multiplying the tractive force imparted to the floating shoe by the drum and translating it into a thrust upon the second shoe along an axis perpendicular to a cord drawn from the heel to the toe of the second shoe.

6. A brake mechanism comprising a rotary drum, an auxiliary internal brake shoe pivotally mounted therein for internal engagement with the drum, a second or primary brake shoe substantially identical with the said auxiliary shoe floatingly mounted within the drum for internal engagement with the drum to partake of the movement thereof, whereby the primary shoe is subjected to greater wear than the auxiliary shoe and which may be interchanged therewith.

7. A brake mechanism comprising a rotary drum, and a trio of internal brake shoes arranged end to end therein for frictional engagement with the drum, the three shoes being substantially identical, one of said shoes constituting a secondarily applied shoe, a second of said shoes constituting a primary floatingly mounted shoe for actuating the secondarily applied shoe, and the third of said shoes constituting an auxiliary shoe, the free ends of the primary and auxiliary shoes being opposed, and means for spreading apart said free ends for initially applying the primary and auxiliary shoes.

8. A brake mechanism comprising a rotary drum, a pair of internal brake shoes mounted therein, actuating means for spreading apart the adjacent free ends of the shoes, means for pivotally mounting the other ends of said shoes, and positive guide means at the adjacent free ends of the shoes for confining the articulative movement of said shoes against lateral movement.

9. A brake mechanism comprising a rotary drum, a pair of internal brake shoes mounted therein, pivotal mounting means for the outer end of one of said shoes, a third and secondarily applied internal shoe for engagement with the drum, and a pivotal connection between the other of said first mentioned shoes and the third shoe affording a floating mounting for the former whereby it may partake of the movement of the drum, and positive guide means at the adjacent free ends of the shoes for confining the articulative and rotary movement of said pair of shoes against lateral movement.

10. A brake mechanism comprising a rotary drum, a pair of opposed internal shoes arranged therein for frictional engagement with the drum, the far end of one of said shoes being articulatively mounted and the far end of the other shoe being floatingly mounted whereby the shoe may partake of the movement of the drum, a brake actuating member, and a mechanically connecting mechanism between said actuating member and the adjacent free ends of the shoes for spreading them apart and for substantially equalizing the pressures applied thereto.

11. A servo-brake mechanism comprising a rotary drum, and a pair of internal brake shoes arranged substantially end to end within the drum for frictional engagement therewith, one of said shoes constituting a secondary brake shoe and being pivotally mounted at its far end, the other of said shoes being a primary shoe, means for applying the far or free end of the primary shoe, and lever means for floatingly mounting the near end of the primary shoe and for translating the force of the rotary servo movement of the primary shoe and for applying said force to the free end of the secondary shoe in a direction normal to a cord of the pivot of the secondary shoe at its free end.

12. A brake mechanism comprising a rotary drum, an auxiliary and a secondary brake shoe, each pivotally mounted therein upon a fixed pivot, for internal engagement with the drum, and a primary or floating shoe articulatively connected with the free end of the secondary shoe for internal engagement with the drum and to partake of the rotary movement thereof and to actuate the secondary shoe, said primary or floating shoe being substantially identical with at least one of said shoes mounted upon a fixed pivot, whereby that shoe may be interchanged with the primary shoe to compensate for wear.

13. In a brake mechanism, a rotary drum, a brake shoe pivotally mounted therein upon a fixed pivot, for internal engagement with the drum, and a floating shoe mounted within the drum for internal engagement therewith and to partake of the rotary movement thereof, said floating shoe being substantially identical with that shoe mounted upon the fixed pivot, whereby the floating shoe may be interchanged therewith to compensate for wear.

In witness whereof, I hereunto subscribe my name this 1st day of October, 1924.

MALCOLM LOUGHEAD.